United States Patent [19]
Stroman

[11] 3,745,318
[45] July 10, 1973

[54] DIGITAL MULTIPLYING CIRCUIT

[75] Inventor: Larry J. Stroman, Houston, Tex.

[73] Assignee: Daniel Industries, Inc., Houston, Tex.

[22] Filed: June 24, 1971

[21] Appl. No.: 156,390

Related U.S. Application Data

[62] Division of Ser. No. 820,872, May 1, 1969, Pat. No. 3,588,481.

[52] U.S. Cl.......... 235/156, 235/151.34, 235/150.52
[51] Int. Cl........................... G06f 7/39, G06f 15/46
[58] Field of Search............... 235/156, 194, 151.34, 235/151.33, 151.12, 150.52, 150.3, 92 DM

[56] References Cited

UNITED STATES PATENTS

| | | | |
|---|---|---|---|
| 3,566,685 | 3/1971 | Zimmerman et al. | 235/151.34 X |
| 3,612,845 | 10/1971 | Lawlor | 235/156 |
| 3,444,360 | 5/1969 | Swan | 235/156 |
| 3,081,031 | 3/1963 | Livesay | 235/151.34 |
| 3,610,898 | 10/1971 | Yamamoto et al. | 235/151.34 |

*Primary Examiner*—Eugene G. Botz
*Assistant Examiner*—James F. Gottman
*Attorney*—Darryl M. Springs et al.

[57] ABSTRACT

This application discloses a circuit for multiplying a known digital signal by a variable multiplying factor for use in correcting actual fluid volume measurements to a standard volume. In one exemplar embodiment, a digitizing circuit generates a discrete series of digital signals proportional to the variable multiplying factor, a digital pulse generator cooperating with the digitizing circuit generates at least a pair of time-spaced digital signals and a multiplying circuit receives the discrete series of digital signals and the pair of time-spaced digital signals and provides a product of the discrete series of digital signals and the known digital signal.

29 Claims, 9 Drawing Figures

Patented July 10, 1973 3,745,318

6 Sheets-Sheet 1

Larry J. Stroman
INVENTOR

Arnold, White & Durkee
ATTORNEYS

Patented July 10, 1973 3,745,318

6 Sheets-Sheet 2

Larry J. Stroman
INVENTOR

Arnold, White & Durkee
ATTORNEYS

Patented July 10, 1973 3,745,318

6 Sheets-Sheet 3

Larry J. Stroman
INVENTOR

Arnold, White & Durkee
ATTORNEYS

Larry J. Stroman
INVENTOR

Arnold, White & Durkee
ATTORNEYS

Larry J. Stroman
INVENTOR

Arnold, White & Durkee
ATTORNEYS

Larry J. Stroman
INVENTOR

Arnold, White & Durkee
ATTORNEYS

DIGITAL MULTIPLYING CIRCUIT

CROSS REFERENCE TO RELATED APPLICATION

This application is a division of co-pending patent application Ser. No. 820,872, filed on May 1, 1969, now U.S. Pat. No. 3,588,481, by Larry J. Stroman.

BACKGROUND OF THE INVENTION

In the measurement of fluids, the measurement is, of course, made at existing conditions. However, in certain technologies, such as the petroleum industry, the accurate measurement of fluid petroleum products is of great economic importance. Further, varying effects of pressure and temperature on the products must be noted, if accurate measurements of fluid volume and flow are to be made.

Gases, of course, are highly compressible and are therefore greatly affected by varying pressures. Temperature is a factor in the accurate measurement of gases, but not nearly as important as it is in the measurement of liquids, which are incompressible under most conditions. Having a measured volume of gas, and knowing the pressure and temperature at which the measurement was made, a corrected measure of the volume of gas may be obtained by using the following equation:

$$Q_{SCF} = Q_{ACF} (P/P_B (T_B/T)$$

where:

$Q_{SCF}$ represents the desired standard volume of gas in cubic feet;

$Q_{ACF}$ represents the actual measured volume of gas in cubic feet;

$P$ represents the pressure of the gas measured;

$P_B$ is the base pressure at which standard cubic feet of gas are measured;

$T_B$ is the base temperature at which standard cubic feet of gas are measured; and $T$ is the temperature at which the actual gas measurements were made.

To correct liquids for temperature, however, is more complicated. There are ASA tables which graphically determine a standard gallon or barrel of liquid measured at existing temperature for a liquid of a known specific gravity.

In practice, it has long been common, especially in the petroleum industry to use mechanical ball disc integrators to perform the desired pressure and temperature corrections on gaseous and liquid products. The ball disc integrators, being a species of mechanical tool, are subject to wear and have accuracy limitations. It is difficult to reduce the margin of error below 1 percent. Further, the ball disc integrators are complex mechanical instruments, and are difficult to calibrate. Such calibration must be performed in the laboratory, necessitating the removal of the device in the field.

Prior art systems of the mechanical type are typified by U. S. Pat. No. 3,012,436 to Myers and U. S. Pat. No. 3,066,529 to Warren.

An electro-mechanical prior art system is illustrated by U. S. Pat. No. 3,176,514 to Foster, where the mechanical movement output of a transducer measuring pressure, temperature or the like is utilized to control an electrical gate which diverts portions of the digital flow meter signal to appropriate counters. The accumulated directed pulses are representative of compensated fluid flow.

U. S. Pat. No. 3,176,514 to Foster, mentioned above, and U. S. Pat. No. 3,043,508 to Wright illustrate totally electrical systems to accomplish compensation. In U. S. Pat. No. 3,176,514, one embodiment receives analog signals representative of the factor for which the fluid flow is to be compensated and such analog signals are applied to a time conversion circuit to adjust or control the time period of a gate through which the digital flow meter pulses pass to a counter. The gate is shut off for a time period to compensate for the pressure, temperature or the like factor thereby modifying the digital signal to compensate for the measured compensation factor.

In U. S. Pat. No. 3,043,508 to Wright, a totally electrical or electronic system is illustrated. However, the multiplying circuit of Wright utilizes a manually preset function for multiplication by a digital flow meter pulse and is not capable of automatic response to varying functions such as pressure, temperature or the like.

A wholly digital multiplication system is illustrated in U. S. Pat. No. 3,566,685 to Zimmerman. In Zimmerman, a series of variable frequency digital pulses is directly generated by an oscillator whose frequency is controlled by the variable function such as pressure, temperature or the like. The variable frequency digital signals are applied to a gate controlled by a one-shot multivibrator which is in turn triggered by the arrival of a digital flow meter pulse. The number of frequency variable digital pulses passed upon receipt of each digital flow meter pulse is related to the compensated flow. However, the use of a Clapp oscillator, the frequency of which is responsive to the measured parameter changes necessitates the use of a subtraction circuit to gross flow from the gross compensated flow to obtain a direct readout of compensated flow, thus increasing the circuit complexity. In addition the circuit of U. S. Pat. No. 3,566,685 cannot utilize analog signals produced by existing transducers and perform the necessary multiplication or compensation function desired.

Accordingly, Applicant has devised an electronic digital multiplying means for translating actual fluid measurements into standard measurements and compensating for temperature and pressure.

SUMMARY OF THE INVENTION

In accordance with the invention, there is provided a novel digital multiplying means for correcting actual fluid measurements to standard measurement units by compensating for the pressure and temperature at which the actual measurement was made. A digitizing circuit is provided for receiving at least one of the parameters of pressure and temperature in the form of an analog signal and generating a digital signal representative of the magnitude of the received parameters. The digital signal is applied to a multiplying circuit for multiplication with incoming flow meter pulses representative of the magnitude of the received parameters. The digital signal is applied to a multiplying circuit for multiplication with incoming flow meter pulses representative of the actual measured volume of fluid flow. The resultant multiplied digital signals are applied to a counting circuit the output of which is applied to a counter for registering the corrected volume of fluid flow at standard conditions.

Accordingly, one primary feature of the present invention is to provide a digital multiplying means for multiplying a digital signal by an analog signal which is digitized prior to multiplication.

Another feature of the present invention is to provide digital multiplying means for use in fluid measurement by digitizing an analog signal representative of at least one of the parameters of pressure or temperature and multiplying the resultant digital signal by another digital signal representative of a measured volume of fluid to obtain a resultant digital signal representing the volume of fluid corrected to standard conditions.

Still another feature of the present invention is to provide digital multiplying means adapted for multiplying the digital signals of several flow meters by a digitized signal representing a common pressure for obtaining corrected standard measurements for each flow meter.

Yet another feature of the present invention is to provide digital multiplying means adapted for obtaining a standard measured volume of a fluid for each of several flow meters and to digitally add the resultant measured volumes to simultaneously obtain the total volume measured by all of the flow meters.

Another feature of the present invention is to provide a digital multiplying means having a provision for at least one division input.

Still another feature of the present invention is to provide a multiplying circuit for obtaining the product between a known digital signal variable and a multiplying factor.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

Figure 1:
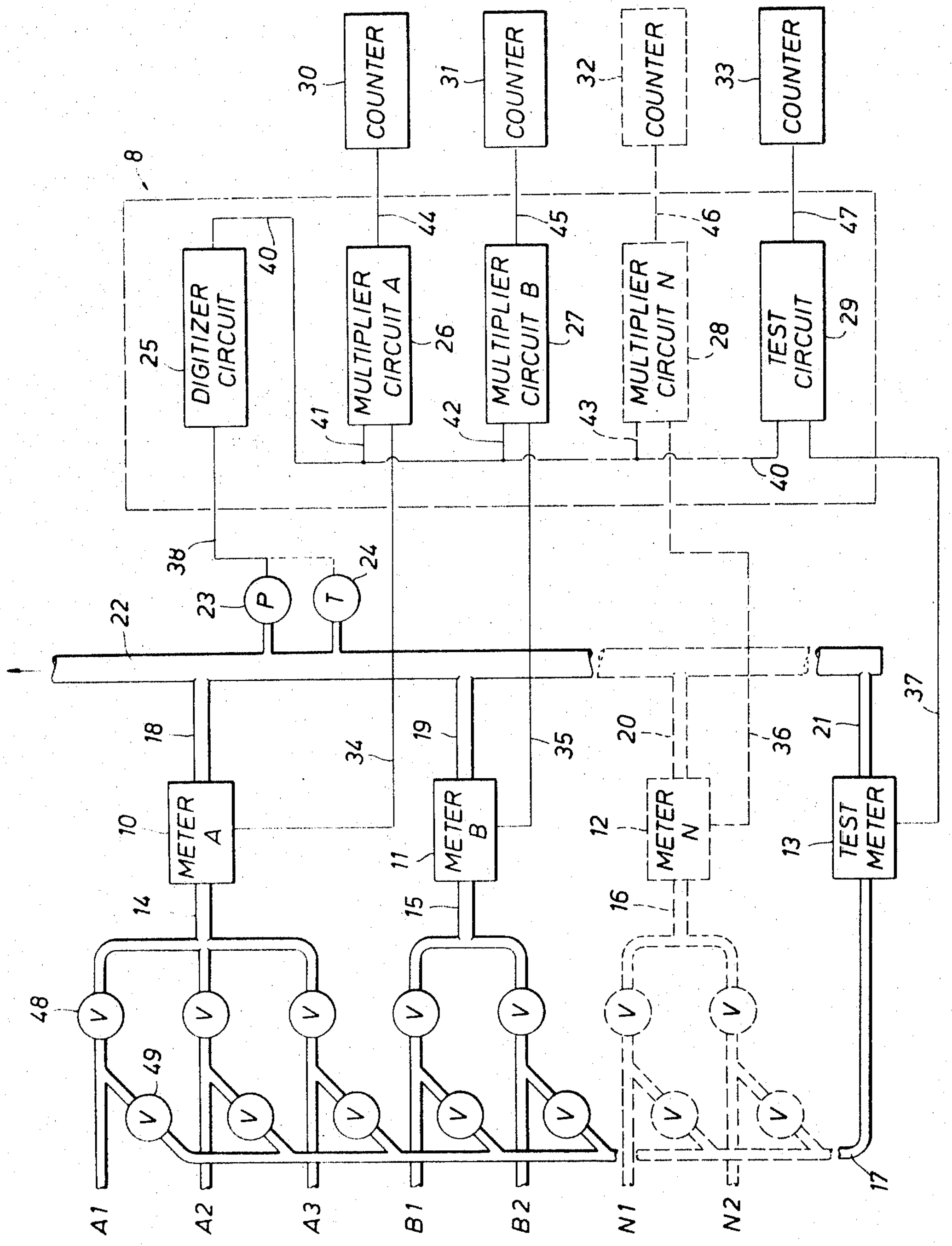
FIG. 1 is a schematic block diagram illustrating one embodiment of the digital multiplying means of this invention as it is utilized for converting actual fluid flow measurements in a pipeline to a standard measurement.

Referring now to FIG. 1, a schematic diagram illustrating the digital multiplier circuit according to the present invention is shown in combination with conventional fluid flow meters. Fluid products flowing in pipelines A1, A2 and A3 are directed to a conventional flow meter 10 through valves 48 and pipe 14. The output of flow meter 10 is connected through pipe 18 to a transfer pipeline 22 for distribution to a remote location. Similarly, pipelines B1 and B2 are shown directing the fluid flow through a pipeline 15 to a conventional metering device 11, whose output is directed via pipeline 19 to the transfer pipeline 22 as hereinabove described. Similarly, any additional number of pipes N1 and N2 carrying fluid products may channel such flow via a pipe 16 (shown in dotted lines) to a meter 12 (shown in dotted lines) and a pipe 20 (shown in dotted lines) and distributed to transfer pipe 22 as hereinbefore described.

The flow from any of the input lines A1, A2, A3, B1, B2, N1, or N2 may be individually directed to a test flow meter 13 by shutting off the fluid flow in the appropriate pipeline by closing valve 48 and opening valve 49 to allow the selected flow to be diverted via pipe 17 to the test meter 13. This arrangement is commonly utilized in practice, and the test flow meter 13 measures the fluid products moving through pipes 17 and 21 for calibration purposes. The output flow through the test flow meter 13 is applied via pipe 21 to the transfer pipeline 22 for distribution as hereinbefore described. Note that the diverted flow of the selected input line, i.e., A1, A2, A3, etc., applied to the test flow meter 13 is returned to the transfer pipeline 22 in order that the total flow through pipe 22 is not varied. However, the total flow in pipes 14, 15 or 16 would be reduced by the quantity of the diverted product flowing through pipeline 17, and hence, meter 10, 11 or 12 would be measuring only a portion of flow that would normally be present in its associated pipelines if a portion of the flow through that pipeline had not been diverted for test purposes.

Flow meters 10, 11, 12 and 13 are typically positive displacement flow meters when used in measuring gaseous or liquid products such as natural gas or oil. In addition, a turbine meter may be utilized when measuring the flow of liquid products such as oil. The flow meters are adapted to produce an electrical signal, commonly by means of switch closures within the meter, that corresponds to a measured quantity of the fluid that has passed through the flow meter.

A digital multiplying circuit 8 is shown having a digitizer circuit 25, identical multiplying circuits 26, 27, 28, etc., and a test circuit 29 for multiplying the respective meter readings of flow meters 10, 11, 12 and 13 by functions of pressure or temperature for correcting the measured gas or liquid flow to a standard value, depending upon differences in pressure and/or temperature from standard conditions. The apparatus shown in FIG. 1 illustrates a typical combination of the digital multiplying means of the present invention as utilized to pressure compensate actual gas flow meter readings to standard measurements at a selected base pressure according to the formula previously discussed:

$$Q_{SCF} = Q_{ACF}\ P/P_B$$

The gas pressure may be measured by a conventional pressure measuring device 23 which generates an electrical signal proportional to the measured pressure. The electrical signal representative of the actual pressure measurement is transmitted via conductor 38 as an input to the digitizer circuit 25. The electrical signals generated by flow meters 10, 11, 12 and 13 are applied via conductors 34, 35, 36 and 37, respectively, as inputs to multiplying circuits 26, 27, 28 and 29, respectively. The pressure signal P is divided by the selected base pressure $P_B$ in digitizer circuit 25 and converted to a digital signal representative of the function $P/P_B$ and applied via conductor 40 to the test multiplying circuit 29, and via conductors 40 and 41 to multiplying circuit 26, via conductors 40 and 42 to multiplying circuit 27, and via conductors 40 and 43 to conversion circuit 28 (shown in dotted lines to represent N number of additional channels that may be utilized). The corrected flow meter signals are applied via conductors 44, 45, 46 and 47 to counters 30, 31, 32 and 33, respectively, for displaying the measured gas flow in standard measurement units.

As will be hereinafter explained, if a portion of the gas flow from any of the incoming pipeline inputs is diverted to pipeline 17 for test flow measurement, the pressure compensator unit 8 has the capability of registering the corrected test flow at the test counter 33 and also add the standard measurements obtained in the test circuit 29 back into the appropriate conversion circuit 26, 27 or 28, corresponding to the meter measurement from which the flow was taken.

Figure 2:
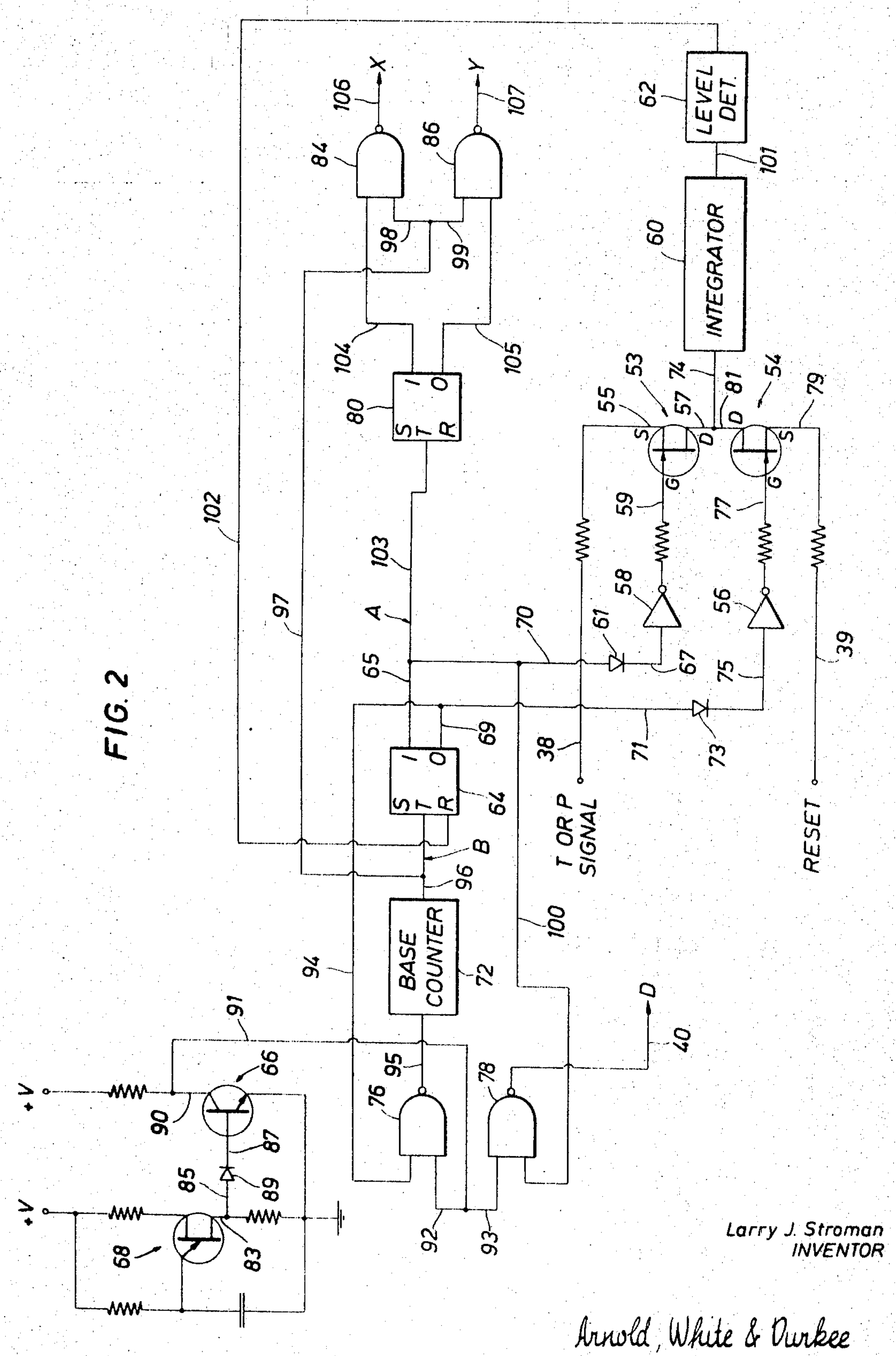
FIG. 2 is an electrical schematic of the digitizer circuit of the digital multiplying means.

A detailed schematic of the digitizer circuit 25 is shown in FIG. 2. The circuit consists of an input switching circuit comprised of inverters 57 and 58 and field-effect transistors 53 and 54, an integrator network 60, a level detector 62, a control circuit comprising the bistable multivibrator 64, a digital pulse generating circuit or means comprising bistable multivibrator 80 and NAND gates 84 and 86, an oscillator circuit means comprising transistors 66 and 68 and an oscillator gating network comprising NAND gates 76 and 78, and a base counter 72 that functions as a timing device for the control circuit. The input signal to the digitizer switching circuit is an analog electrical signal representing pressure, as measured by pressure device 23 (see FIG.1) and is applied via conductor 38 to the source lead 55 of the field-effect transistor 53. A predetermined reset voltage or analog signal is applied via conductor 39 to the source lead 79 of a field-effect transistor 54. The drain leads 57 and 81 of transistors 53 and 54, respectively, are connected to conductor 74 and applied as an input to integrator circuit 60. The output of the integrator 60 is applied via conductor 101 to the input of level detector 62, the output of which is in turn applied to the reset input of bistable multivibrator 64 via conductor 102. The switch operation of field-effect transistors 53 and 54 are controlled by the state of the bistable multivibrator 64 as will be hereinafter more particularly explained.

The 1 output of bistable circuit 64 is applied as an input to a conventional inverter circuit 58 via conductors 56 and 70, diode 61 and conductor 67. The 0 output of bistable circuit 64 is applied as an input to a conventional inverter circuit 56 via conductors 69 and 71, diode 73 and conductor 75. The outputs of inverters 56 and 58 are applied via conductors 77 and 59 to the gate leads of field-effect transistors 53 and 54, respectively.

The oscillator circuit means utilized is a basic relaxation oscillator employing a unijunction transistor 68. In the configuration shown, the output of the relaxation oscillator is applied via one of the base leads 83 of unijunction transistor 68, conductors 85 and 87, and diode 89 to the base of an NPN transistor stage 66. Transistor 66 is normally biased to cut-off, but conducts when the positive going pulses from base 83 of transistor 68 are applied to the base of transistor 66. The output of the collector lead 90 of transistor 66 is applied via conductors 91 and 92 as one input of NAND gate 76 and via conductors 91 and 93 as one input of NAND gate 78. NAND gates 76 and 78 form an oscillator gating circuit, the output of NAND gate 76 forming a first signal applied to counter 72 and the output of NAND gate 78 forming a second signal applied to multiplying circuit 25 etc. The 0 output of bistable circuit 64 is also applied via conductors 69 and 94 to the other input of NAND gate 76. The oscillator pulse output from NAND gate 76 is applied via conductor 95 to a base counter 72 which counts the number of pulses passed by gate 76.

The base counter 72 may be any conventional counting circuit of sufficient capacity to count the oscillator pulses passed by gate 76 and provide a sufficient time delay for the application of the input pressure signal to the integrator 60 as will be hereinafter explained in greater detail. In the preferred embodiment, two divide-by-16 circuits are cascaded to enable the counter 72 to count 256 discrete pulses. When the counter has achieved its capacity, an output pulse is generated and applied via conductor 96 to the trigger input of bistable circuit 64 for changing the state of bistable device 64 and controlling the switch operation of transistors 53 and 54.

The oscillator output is also applied via conductors 91 and 93 to one input of NAND gate 78. The other input to gate 78 is connected to the 1 output of bistable circuit 64 via conductors 65, 70 and 100. The state of bistable circuit 64 also controls gates 76 and 78. When NAND gate 76 is enabled, the oscillator pulses are passed by gate 76 to the base counter as previously described. When NAND gate 78 is enabled, the oscillator pulses are passed via conductor 40 to the multiplying circuits as the digitized function of the analog input signals for purposes to be more fully explained.

The 1 output of bistable circuit 64 is also applied via conductors 65 and 103 to the trigger input of another bistable circuit 80 which controls the operation of NAND gates 84 and 86 via conductors 104 and 105, respectively. The output of base counter 72 is also applied via conductors 96, 97 and 98 to the other input of gate 84, and via conductors 96, 97 and 99 to the other input of gate 86. The output of gates 84 and 86 are applied out through conductors 106 and 107, respectively. The output voltage levels of bistable circuit 64 applied via conductors 65 and 69 form a pair of control signals for controlling the operation of the switching circuit (transistors 53 and 54), the digital pulse generating circuit (bistable circuit 80 and gates 84 and 86) and the operation of the gating circuit of the oscillator means.

For purposes of explaining the circuit operation, a positive logic will be assumed, using the terms "high" and "low" to indicate a positive voltage and a substantially zero voltage, respectively. Of course, it may be seen by one skilled in the art that any desirable logic convention may be utilized with appropriate changes in biasing and polarity of voltage sources.

Figure 4:
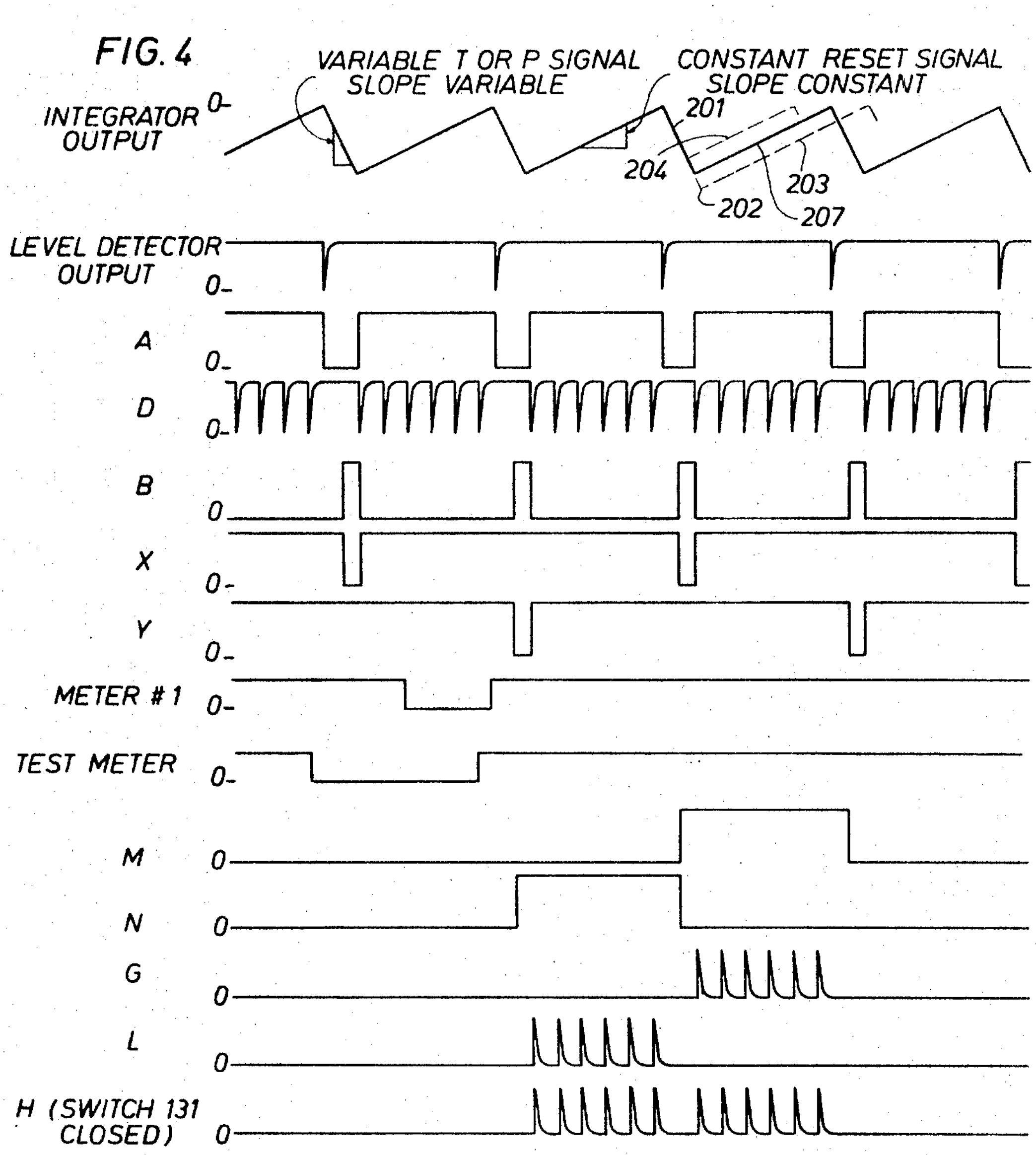
FIG. 4 is a pulse diagram illustrating the time relationship between the integrator signal waveform and key control pulses of the digitizer and multiplying circuits.

Referring now to FIGS. 1, 2 and 4, the operation of the digitizer circuit will be explained in detail. Assuming that the 1 output of bistable circuit 64 is low, diode 61 is reverse biased and blocks the application of the low 1 output of bistable circuit 64 as an input to inverter 58. Inverter 58 may be a conventional common-emitter circuit biased so that it is normally conducting. In the circuit shown, the inverter 58 is assumed to be a transistor whose output is at ground potential or zero volts. With ground potential or zero volts applied to the gate lead 59 of transistor 53, when a positive analog input signal of unknown value (representative of pressure) is applied via source lead 55 through conductor 38, the field-effect transistor 53 has a very low reverse bias, thereby allowing maximum conduction. The output of transistor 53 is applied via conductors 57 and 74 to the integrator circuit 60, a conventional integrating circuit including an operational amplifier and an RC circuit for accomplishing the integration process. The signal applied as an input to the integrator circuit 60 produces a negative going output signal from the integrator having a variable slope depending on the magnitude of the input analog signal. (see FIG. 4).

At the same time the low 1 output of bistable circuit 64 is applied to diode 61, the high 0 output of bistable circuit 64 is applied via conductor 71 to the anode of diode 73 and via conductor 75 as a positive signal level input to inverter 56. Inverter 56 is a conventional common-emitter circuit identical to inverter 58 previously described. With a high input to inverter 56, inverter 56 is non-conducting and the inverter output will be negative with respect to ground potential thereby reverse-biasing the field-effect transistor 54 and pinching off the flow of current through transistor 54, and effectively switching off the reset voltage or predetermined analog signal applied via conductor 39.

Transistor 53 will continue to conduct and apply an input signal representative of the varying analog signal applied via conductor 38 to integrator circuit 60 as long as the 1 output of bistable circuit 64 remains low. However, when bistable circuit 64 is triggered to its other state, the 1 output becomes high and the 0 output goes low, thereby reversing the switching action of transistors 53 and 54. With this change in state of bistable device 64, inverter 58 becomes non-conducting and a negative voltage is applied to the gate lead 59 of transistor 53, thereby highly reverse biasing the transistor and pinching off the input analog signal. However, transistor 54 is now conducting the predetermined analog signal via conductor 39 is applied to the source lead 79 of transistor 54, whose output is applied via conductors 81 and 74 as an input to integrator circuit 60. The application of the predetermined analog signal ( a negative voltage) to integrator 60 causes the integrator output signal to rise from a negative value toward zero volts at a constant slope determined by the predetermined value of the reset voltage (see FIG. 4).

With the 1 output of bistable circuit 64 low, (see FIG. 4 and the waveform shown as A and taken at A in FIG. 2) transistor 54 pinches off the reset voltage or predetermined analog signal and the input analog signal representative of pressure is passed by the conducting transistor 53. The high 0 output of bistable circuit 64 is applied via conductor 94 to enable NAND gate 76 and allow the gate to pass the positive input oscillator pulses to base counter 72. The low 1 output of bistable circuit 64 disables NAND gate 78. As soon as the base counter 72 has reached its capacity, an output pulse is generated and applied to the trigger input of bistable circuit 64, thereby causing the 1 output to go high and the 0 output to go low. When bistable circuit 64 is triggered, the varying analog input signal is switched off by the action of transistor 53 as previously described and the predetermined analog signal (the reset voltage) is applied to integrator 60 as hereinabove described. Simultaneously, the high 1 output of bistable circuit 64 enabled NAND gate 78 via conductors 65 and 100, allowing the oscillator pulses to be passed through gate 78 and applied to the multiplying circuits (see FIG. 1) via conductor 40, as D pulses, for purposes to be hereinafter more fully described.

The output signal of the integrator circuit 60, as previously described, is a negative wave-form having a variable slope determined by the magnitude of the input analog signal applied via conductor 38. The input signal is applied to the integrator 60 for a fixed time period, i.e., the time during which the 1 output of bistable circuit 64 is low, and the base counter 72 is counting its capacity of pulses from the oscillator circuit. Therefore, a negative going waveform will appear at the output of the integrator during this time period. When base counter 72 triggers bistable device 64 and switches off the input signal applied via conductor 38, the predetermined reset voltage will be applied via conductor 39 and transistor 54 to integrator circuit 60. The integrator output signal then becomes a positive going waveform having a constant positive slope determined by the magnitude of the predetermined analog signal or negative reset voltage as may be seen in FIG. 4. The leading edge of the waveform shown at A goes from high to low when bistable circuit 64 is reset by the level detector as will be hereinafter explained, and the positive pressure signal is applied to integrator 60. When base counter 72 counts its capacity, a positive output signal as seen at B in FIG. 2 and shown as the B waveform in FIG. 4 returns to zero volts in a negative going direction, thereby triggering bistable circuit 64. At the same time, the waveform at A (1 output of bistable device 64) returns to a high state, pinching off the variable analog input signal by the action of transistor 53 and applying the predetermined analog signal or negative reset voltage as hereinbefore described. D-pulses are once again passed by NAND gate 78.

When the integrator output signal is restored to a zero-volt level, the threshold level detector circuit 62 produces a negative pulse applied via conductor 102 to the reset input of bistable control circuit 64, thereby resetting the bistable circuit. The level detector 62 may be any conventional circuit acting as a threshold detector and having a positive output as long as the input from the integrator 60 is negative, but producing a negative going pulse (see FIG. 4) as soon as the integrator output reaches zero volts in the positive-going direction. When the level detector resets bistable circuit 64, the input signals are again passed through field-effect transistor 53 to the input of integrator circuit 60 and the integrating cycle is repeated as hereinbefore described.

When bistable control circuit 64 is reset, NAND gate 78 is disabled, the oscillator pulses are blocked, and the discrete series of D pulses is stopped as shown in FIG. 4. Therefore, the output of NAND gate 78 will be a burst of discrete pulses during the time when the reset voltage is applied to integrator 60. since the unknown input analog signal level is applied to integrator 60 during a discrete time period, i.e., the counting time of the base counter as reflected in the waveform A, the output signal of integrator 60 will reach an unknown maximum negative signal level just as bistable circuit 64 is triggered by the base counter 72. The negative reset voltage is then applied to the integrator 60 and restores the integrator output signal waveform from a maximum negative signal level to zero volts and is therefore proportional to the unknown analog input signal. In turn, the number of discrete pulses in the signal series passed by NAND gate 78 is proportional to the time the reset voltage is applied to integrator 60 and is a measure of the input analog signal level.

The cycle will be continuously repeated with NAND gates 76 and 78 alternately passing oscillator pulses via conductors 95 and 40 to the base counter 72 for determining the time period during which the input signal is applied to integrator circuit 60 or as D pulses proportional to the input analog signal, respectively.

Bistable circuit 80 of the pulse generating circuit is triggered only when the 1 output of bistable circuit 64 goes low thereby dividing the signal frequency of bistable circuit 64 by two. When the 1 output of circuit 80 is high, NAND gate 84 is enabled and passes the base counter 72 output signal when received (see pulse B in FIG. 4). The counter output signal is passed through the enabled gate 84 and applied through conductor 106 to the conversion circuits as an X-pulse for purposes to be hereinafter further described. When the 0 output of bistable device 80 is high, NAND gate 86 is enabled, and passes the base counter 72 output signal via conductor 107 as a Y pulse (see FIG. 4). The Y pulse will be utilized in the multiplying circuitry as will be hereinafter more particularly described. The X and Y-pulses or signals comprise a pair of time-spaced signals supplied to multiplying circuits 25 etc. The NAND gates 76, 78, 84 and 86 may be any conventional NAND gate. Further, the bistable circuits 64 and 80 may be of any conventional bistable multivibrator design utilizing a conventional RST connection configuration.

The oscillator circuit was previously described as a relaxation oscillator. Of course, any conventional oscillator circuit may be employed without affecting the operation of digitizer circuit 25. Further, it will be noted that the output of the digitizer circuit, the burst of D pulses or a discrete series of digital signals, proportional to the input analog signal level, will be independent of the frequency of the oscillator circuit. As may be seen in FIG. 4, if the frequency is greater the time during which the pressure signal is integrated will be shorter, since counter 72 will reach its capacity in a shorter period of time. Therefore the negative going portion of the integrator output will be shortened as represented at 201. However, since the maximum negative voltage level reached by 201 is less, the positive going portion 204 of the waveform will also be shorter since the return to 0 volts will be achieved in a shorter period of time by the reset voltage. Since the D pulses are generated during this time period, the same number of pulses will be passed although the time period is shortened due to the increased frequency of the pulses, thereby compensating for the higher frequency.

The reverse is true for a lower frequency as represented by a greater negative peak 202 and a greater positive going portion 203. The longer time period represented by 203 will allow the same number of lower frequency oscillator pulses to be passed as D pulses, thereby compensating for the lower frequency. The same time-related characteristics of the integrator output waveform compensate for variations in integrator gain and render the circuit insensitive to integrator gain changes.

Figure 3:
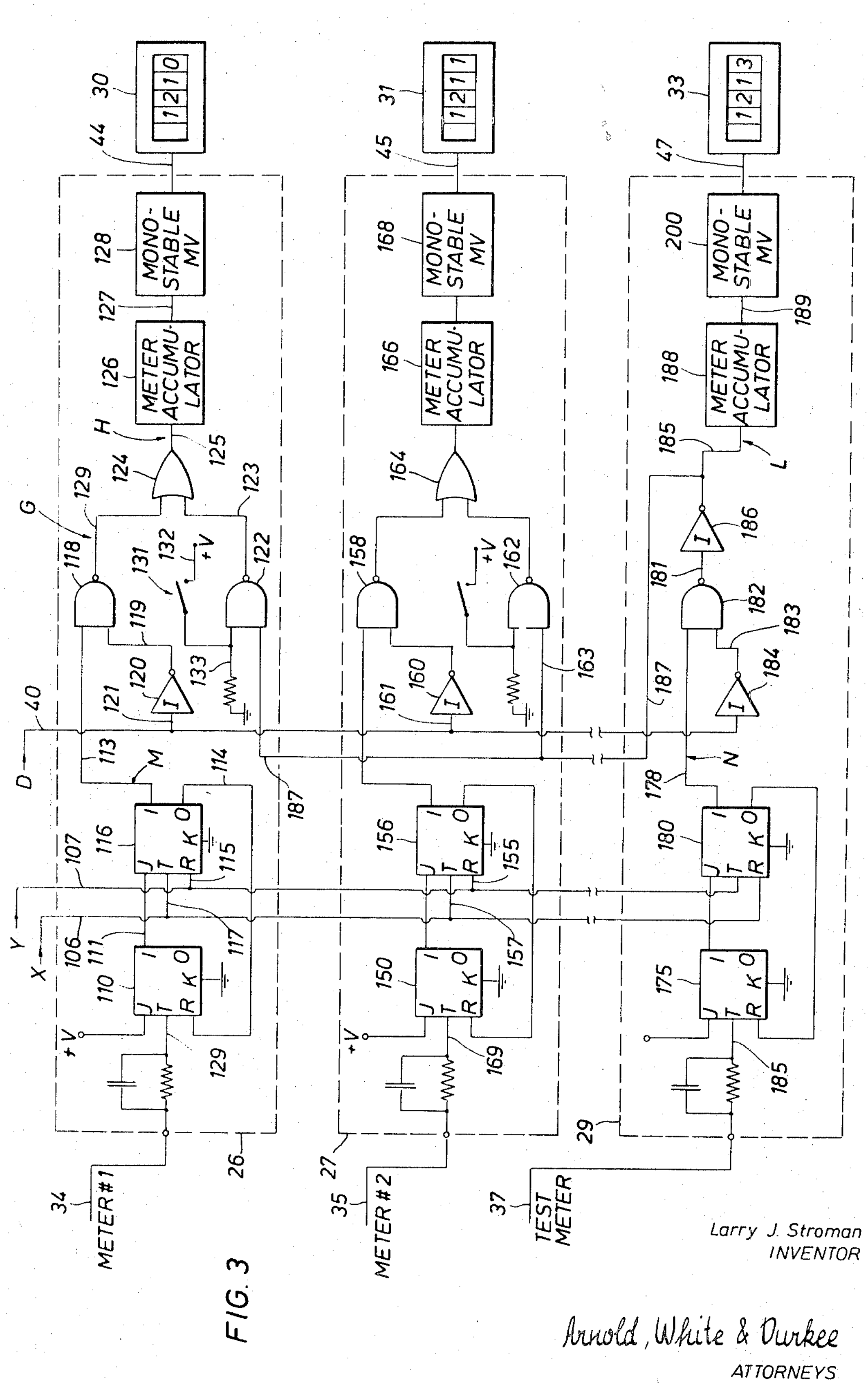
FIG. 3 is an electrical schematic of the multiplying circuits utilized by the digital multiplying means.

Referring now to FIGS. 1, 3 and 4, the multiplying circuits of the pressure compensator 8 are shown. The D-pulses or signals (the discrete series of oscillator pulses proportional to the input pressure signal) are applied via conductors 40 and 121 to an inverter circuit 120 of the first multiplier circuit 26 and via conductors 40 and 161 to an inverter circuit 160 of the second multiplier circuit 27. The D-pulses are also applied via conductor 40 to any additional multiplier circuit channels (see FIG. 1), and as an input to an inverter circuit 184 in the test circuit.

The X-pulse output of NAND gate 84 (see FIG. 2) is applied via conductors 106 and 117 as the trigger input to a bistable circuit or gating circuit 116 in the first multiplier channel, and via conductors 106 and 157 as the trigger input to a bistable circuit 156 in the second multiplier channel. The X-pulses are also applied via conductor 106 to any additional multiplier channels that may be utilized, and are also applied as a reset input to a bistable circuit 180 of the test circuit.

The Y-pulse output of NAND gate 86 (see FIG. 2) is applied via conductors 107 and 115 as a reset input to the bistable circuit or gating circuit 116 of the first multiplier circuit. The Y-pulses are also applied via conductor 107 and 155 to the reset input of bistable circuit 156 of the seocnd multiplier channel, and via conductor 107 to any additional multiplier channels desired to be utilized. Y-pulses are also supplied via conductor 107 to the trigger input of the bistable circuit 180 of the test circuit.

Digital pulses generated by flow meters 10, 11 and 13 are transmitted via conductors 34, 35 and 37 as inputs to multiplier circuits 26, 27 and 29, respectively. Of course, any additional N-number of flow meters 12 (see FIG. 1) may be utilized and the digital pulses generated by such flow meters would be applied via a typical conductor 36 to a corresponding N-number of multiplier circuits, shown generally at 28. Since the circuitry of each circuit 26, 27 and 28 are identical, a detailed description of the circuit and its operation will be made for only the first multiplier 26, and will be equally applicable to the remaining multiplier circuit. However, test multiplier circuit 29 is modified and will be described in detail.

A flow meter signal, indicating that a measured quantity of gas has passed through the flow meter 10 is applied via conductor 34 through an RC coupling network to the trigger input 129 of bistable circuit or gating circuit 110 of multiplier circuit 26. The first gating circuit 110 is a JK configuration connected for operation as a latching circuit. When a flow meter pulse is received at the trigger input 129 of bistable device 110, the 1 output of the bistable circuit 110 goes to a high level and is applied via conductor 111 to the J-input of a bistable circuit 116. The 1 output of circuit 110 will only be high when a flow meter pulse is received. The high 1 output of circuit 110 prepares bistable circuit or the second gating circuit 116 to operate when an X-signal is applied via conductors 106 and 117 to the trigger input. If the J-input to bistable circuit 116 is low, the received X-signal will not effect circuit 116. If, however, the J-input of the second gating circuit 116 is high, indicating that a meter digital signal has been received, the next incoming X-signal will trigger bistable circuit 116 via conductor 106 and 117 causing the 1 output of circuit 116 to go high. The 1 output of circuit 116 will remain high until a Y pulse is applied via conductors 107 and 115 to the reset input of bistable circuit 116. The state of bistable circuit 116 is then changed and the 1 output goes low. The resulting waveform appearing in conductor 113 is shown as M in FIG. 4. The 0 output of circuit 116 is applied via conductor 114 to the reset input of bistable circuit 110 to reset the latching circuit 110 when the X-pulse has been received by bistable circuit 116, thus preparing circuit 110 to receive the next triggering meter pulse.

The 1 output of bistable circuit 116 is applied via conductor 113 to one input of NAND gate 118, which, together with inverter 120 and OR gate 124 form a third gating circuit or means. D pulses from inverter 120 are applied via conductor 119 to the other input of NAND gate 118. When the 1 output of bistable circuit 116 is high, during the time interval between successive time-spaced X and Y-signals after a received predetermined meter digital signal as shown at M in FIG. 4, gate 118 is enabled and passes the received D pulses. The passed D pulses (see signals sampled at G of FIG. 3) are passed via conductor 129 as one input to OR gate 124. The timing of signals X and Y is such that X occurs before the burst or discrete series of D pulses have been received by inverter 120, and signal Y occurs after the conclusion of the burst of D pulses. If bistable circuit 116 is enabled, the X and Y-pulses create a positive waveform or "window" (shown at M of FIG. 4), during which the discrete series of received D-pulses will be passed to OR gate 124. Thus each received digital meter signal is multiplied by a burst or discrete series of D-pulses representative of the magnitude of the analog signal to be passed to the accumulator and the counter.

The discrete series applied to OR gate 124 will be passed via conductor 125 to a meter accumulator circuit 126. Accumulator 126 may conveniently be any conventional counting circuit having a capability of counting a predetermined number of discrete D pulses and generating a single pulse output when the counter has reached its maximum counting capability. When accumulator 124 has reached its counting capability, an output pulse is generated and applied via conductor 127 to a monostable multivibrator or "one shot" 128.

The one-shot circuit 128 may be any conventional monostable multivibrator circuit that may be utilized for driving the coil of an electromechanical or electronic counter 30. One-shot circuit 128 receives the accumulator 126 output pulse and is triggered to its unstable state and produces an output pulse applied via conductor 44 to the coil (not shown) of counter 30. One-shot circuit 128 then returns to its stable state to await the next accumulator pulse. Counter 30 may be any conventional readout or display counter, either electronic or electromechanical. The accumulator pulses applied via one-shot 128 will be registered in counter 30 as the corrected standard measurement of the gas flowing through flow meter 10 (see FIG. 1).

As hereinbefore described, the additional conversion circuits 27, 28, etc., are identical to the circuit 26 hereinbefore described, and will not be described.

Referring now to FIGS. 1, 2, 3 and 4, if valve 48 is shutoff and valve 49 is opened, the gas flowing in line A1 will be diverted through line 17 to a test flow meter 13 and discharged through line 21 to the transfer pipeline 22 as hereinbefore described. The flow through line 14 and flow meter 10 will be reduced by the amount of gas flow diverted to test meter 13, and meter 10 will register a correspondingly smaller flow measurement than normal.

The meter signal from flow meter 13 is applied via conductor 37 through an RC coupling network to the trigger input 185 of a bistable multivibrator 175 (see FIG. 3). Bistable multivibrators 175 and 180 are JK connected bistable circuits utilized for latching circuit purposes identical to circuits 110 and 116 previously described in detail. A high 1 output of bistable circuit 180 will be applied via conductor 178 as one input to NAND gate 182, when Y and X-pulses via conductors 106 and 107 are received, if bistable circuit 175 has been triggered by a meter pulse. Note that the application of the X and Y-pulses to the inputs of bistable circuit 180 is reversed from that of circuits 116 and 156. The Y pulse is applied to the trigger input of bistable circuit 180, however, circuit 180 is not triggered until the first Y-pulse arrives after the test meter signal has ended. The X-pulse will reset bistable circuit 180. It may be seen that the test circuit 29 will operate between successive Y and X-pulses, while the other multiplying circuits operate between successive X and Y-pulses. This alternation of time periods allows the test circuit pulses to be added back into one of the multiplying circuits without interference.

D-pulses via conductor 40 are applied through inverter 184 and conductor 183 to the other input of NAND gate 182. With a high enabling signal level present at the 1 output of bistable circuit 180, gate 182 will pass the D-pulses applied as an input through conductor 183. The D-pulses are applied out of gate 182 through conductor 181 to a conventional inverter circuit 186. The inverted D signals are applied through conductor 185 as an input to an accumulator or counting circuit 188. The accumulator circuit 188 is identical to the accumulator circuit hereinbefore described for first multiplier circuit.

When accumulator 188 has reached its capacity, an output pulse is generated and transmitted via conductor 189 to the input of a conventional monostable multivibrator circuit 200. One-shot circuit 200 generates a pulse applied via conductor 47 to counter 33 to register the correct reading.

As previously discussed, the reading of flow-meter 10, channeled through multiplier circuit 26 and registered on meter 30 will reflect a reduced flow due to the diversion of line A1 through the test flow meter 13.

However, compensator circuit 8 provides a means of registering the flow of line A1 in counter 33 and simultaneously adding the corrected flow determined in the test circuit 29 back into the first channel for registering the total cumulative flow in counter 30.

The inverted D pulses are also applied via conductors 185 and 187 to one input of NAND gate 122 in the first multiplier circuit 26. Similarly, the inverted D pulses are applied via conductors 185, 187 and 163 to one input of NAND gate 163 of multiplier circuit 27, and via other conductors (not shown) to corresponding NAND gates in other channels. The other input to NAND gate 122 is normally resistively coupled to ground potential via conductor 133, thereby disabling NAND gate 122 and inhibiting the passage of inverted D pulses via conductor 187. However, if it is desired to add into converter circuit 26 of the corrected flow measured in the test circuit 29, switch 131 is closed, thereby applying a positive voltage level via conductors 132 and 133 to gate 122. With gate 122 thus enabled, the inverted D-pulses transmitted via conductor 187 are passed through gate 122 and applied via conductor 123 to OR gate 124. With switch 131 closed, sampling of the output of or gate 124 at H may be seen in FIG. 4.

Since the test circuit operates during the time period between received Y and X-pulses, as hereinbefore described, the D pulses transmitted via conductor 187 and passed by gate 122 will occur during the alternate time cycle from the cycle during which the D pulses are passed by gate 118, i.e., during the time between successive X and Y-pulses. Therefore, with switch 131 closed, OR gate 124 will pass a discrete series of D pulses from gate 118 during the X-Y time cycle, and will pass a discrete series of D-pulses from gate 122 during the Y-X time cycle (see FIG. 4 at H). Accumulator 126 will receive the additional test circuit pulses and the diverted flow will be cumulatively totaled with the actual flow measured and corrected via pulses passing gate 118. Counter 30 will register the total corrected flow to provide the cumulative corrected station meter reading.

The above description of the digital multiplying means was based on pressure compensating gas flow measurements. If a refinement of the correction is desired by further taking into consideration temperature, the following mathematical equation is applicable:

$$Q_{SCF} = Q_{ACF}\ (P/P_B)\ (T_B/T)$$

Since $P_B$ and $T_B$ are constants, the equation may be simplified as follows:

$$Q_{SCF} = Q_{ACF}\ (k)\ \mathrm{P/T}$$

where the constant $k$ represents $T_B/P_B$

The temperature function as a divisor input may be applied via conductor 39 in lieu of the predetermined reset signal which functions as a divisor input $P_B$ in the earlier equation:

$$Q_{SCF} = Q_{ACF}\ (P/P_b)$$

By proper selection of circuit parameters and the voltage range of the reset signal, T-signals may be applied via the reset input as a variable divisor input. Similarly, it may be seen that the ratio of $P/T$ may be utilized as a multiplying factor to produce a product of the predetermined digital signal ($Q_{ACF}$) and the $P/T$ factor. $P$ and $T$ may be supplied as input analog signals.

When measuring liquids, pressure is not usually an important consideration since, for most purposes, liquids are considered incompressible. However, temperature variations can greatly affect the volume of liquid and thus it is often desirable to compensate liquid measurements especially in the oil industry for temperature changes.

Referring now to FIGS. 1, 2, 3 and 5, if the fluid flowing in the pipelines A1 through N2 is a liquid, such as oil or gasoline, the digital multiplying means 8 shown in FIG. 1 may be employed for temperature compensation. The identical circuitry shown in FIGS. 2 and 3 for the digitizer and multiplying circuits may be employed.

Figure 5:
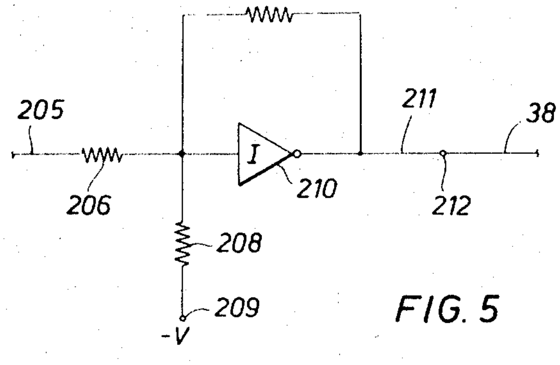
FIG. 5 is a simplified electrical schematic diagram of an input circuit for converting electrical signals representative of temperature to a predetermined function of temperature prior to application to the digitizer circuit when liquid flow measurements are made.

However, the temperature signal generated by a temperature measuring device 24 (see FIG. 1) must be translated into an additional temperature function for complying with standard measurement tables, such as ASA Z11.83 — 1953 for petroleum products. A translation circuit is shown in FIG. 5. The input temperature signal is applied via conductor 205, and a resistor 206 to the input of an operational amplifier 210. The voltage source 209 and resistor 208 form a second input that determines the new desired function of temperature, applied out via conductor 211 to a terminal 212 and thence to conductor 38 as an input to the digitizer circuit 25. As earlier mentioned, the applied function of temperature is digitized and applied to the multiplying circuits as hereinbefore described for the pressure correction of gas flow measurements.

Figure 6:
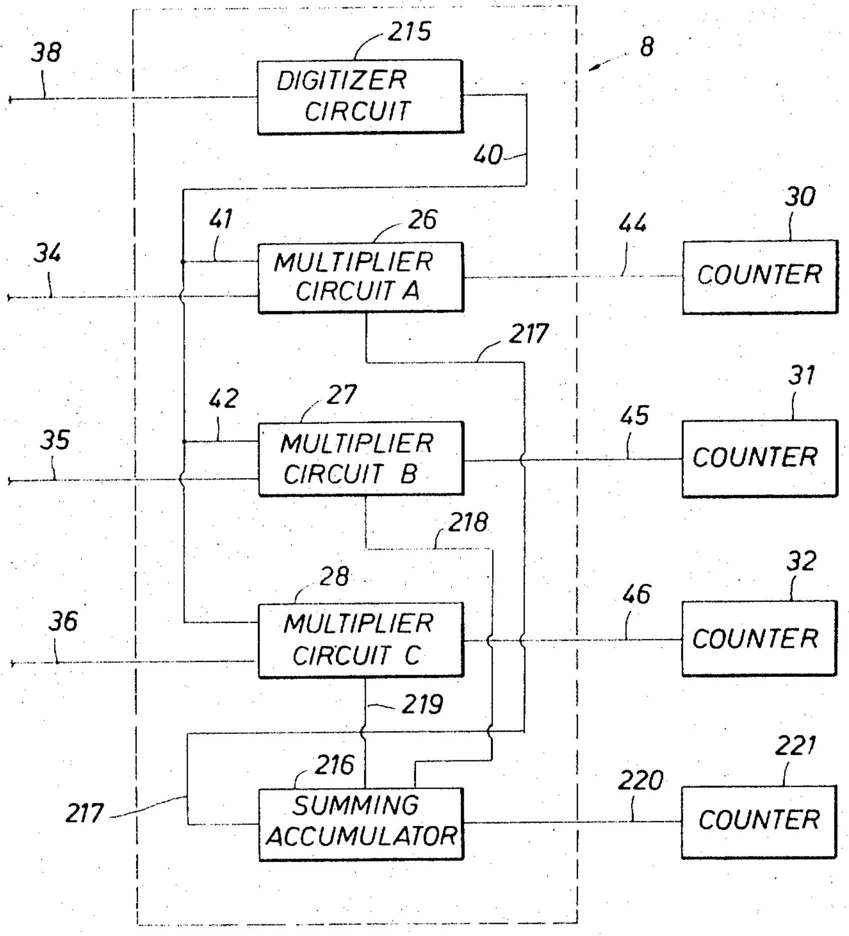
FIG. 6 is a schematic block-diagram illustrating another embodiment of the digital multiplying means as it may be utilized as for converting actual fluid flow measurements to a standard measurement and summing all meter measurements to obtain total flow.

In some applications, it may be desired to determine the corrected standard measurements for each meter and then determine the total flow in the transfer pipeline 22 shown in FIG. 1. Such a total may be achieved by summing each of the corrected standard measurements made for the individual meters. The digital multiplying means 8 as shown in FIG. 1 may be modified slightly as shown in FIG. 6 to accomplish the transfer pipeline summation. Pressure or temperature would be applied via conductor 38 to a modified digitizer circuit 215. Flow-meter signals would be applied via conductors 34, 35 and 36 to multiplier circuits 26, 27 and 28 respectively. The digitized output from circuit 215 is applied via conductors 40 and 41 as an input to circuit 26, via conductors 40 and 42 to circuit 27, and via conductor 40 to circuit 28. The multiplied outputs of circuits 26, 27 and 28 are applied to counters 30, 31 and 32 via conductors 44, 45 and 46, respectively.

A summing accumulator 216 is provided for receiving the digital pulses from each of the multiplier circuits 26, 27 and 28 for summing. Accumulator 216 consists of an OR gate 124, a meter accumulator circuit 126, and a one-shot 128 identical to that shown in FIG. 3 for multiplier circuit 26. Digital pulses from multiplier circuits 26, 27 and 28 are applied via conductors 217, 218 and 219, respectively. Each of conductors 217, 218 and 219 would be applied as an input to the OR gate 124 preceding the meter accumulator 126. The OR gate would have three inputs and allow pulses present at either one of the conductors to pass to the accumulator circuit 126 as hereinbefore described for multiplier circuit 26. The accumulator output, triggered by a one-shot 128, is applied via conductor 220 to a summing counter 221.

Figure 7:
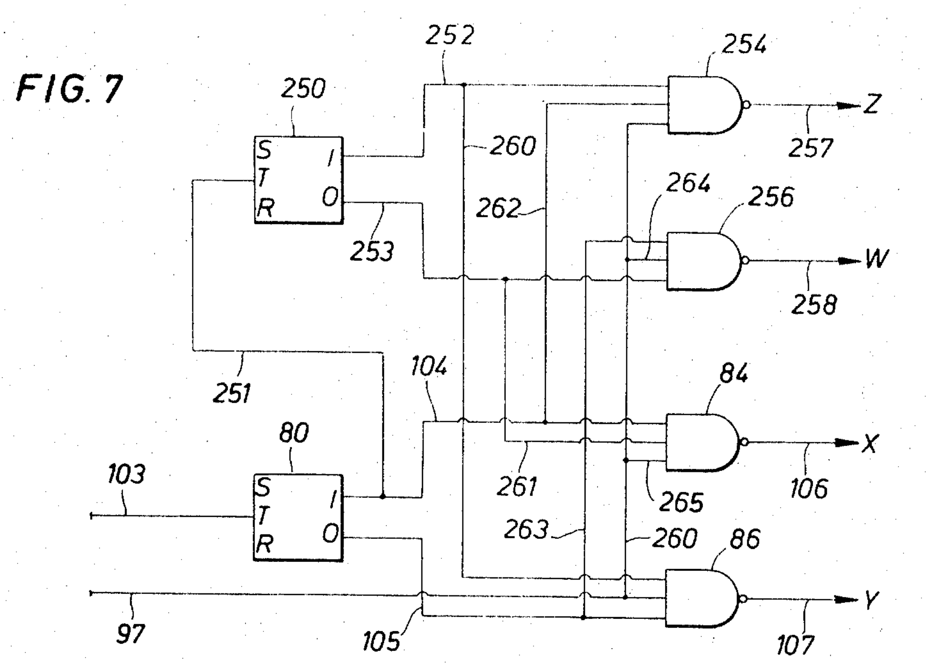
FIG. 7 is an electrical schematic of a portion of the digitizer circuit showing a modification of the control circuit for generating additional control pulses.

To sum three or more meter outputs requires additional time separation of the digitized pulses for each meter channel in contrast to the two "time window" separation slots (See FIG. 4 at M and N) utilized in digitizer circuit 25. To achieve additional "time windows," the control circuitry of digitizer 25 must be modified as shown in FIG. 7.

Control bistable multivibrator 80 receives a trigger input via conductor 103. The 1 output of circuit 80 is applied via conductor 104 to one input of NAND gate 84, via conductors 104 and 251 to the trigger input of bistable circuit 250, and via conductors 104 and 262 to one input of NAND gate 254. The O output of bistable circuit 80 is applied via conductor 105 to one input of NAND gate 86, and via conductors 105 and 263 to one input of NAND gate 256. Conductor 97 (from the output of base counter 72 as shown in FIG. 2) applies the base counter output pulse B to a second input of NAND gate 86, and in cooperation with conductors 260, 265 and 264 apply the base counter pulse B as an input to NAND gates 84, 256 and 254. The 1 output of bistable circuit 250 is applied via conductor 252 to NAND gate 254, and via conductors 252 and 260 as another input to NAND gate 86. The 0 output of bistable circuit 250 is applied via conductor 253 to one input of NAND gate 256 and via conductors 253 and 261 to another input of NAND gate 84.

Bistable circuits 80 and 250 form a conventional "divide by four" circuit to divide the 1 output signal of bistable circuit 64 into four control signals W, X, Y and Z, applied out of NAND gates 256, 84, 86 and 254 via conductors 258, 106 107 and 257, respectively. Four "time windows" may be utilized as follows:
between successive W and X, X and Y, Y and Z, and Z and W pulses. The circuit shown in FIG. 6 would only need to employ three time windows to handle multiplier circuits 26, 27 and 28. However, the control circuitry shown in FIG. 7 would allow a fourth "time window" for summing purposes. Of course, other frequency dividers may be used to achieve additional "time windows" and allow additional channels for summing.

Figure 8:
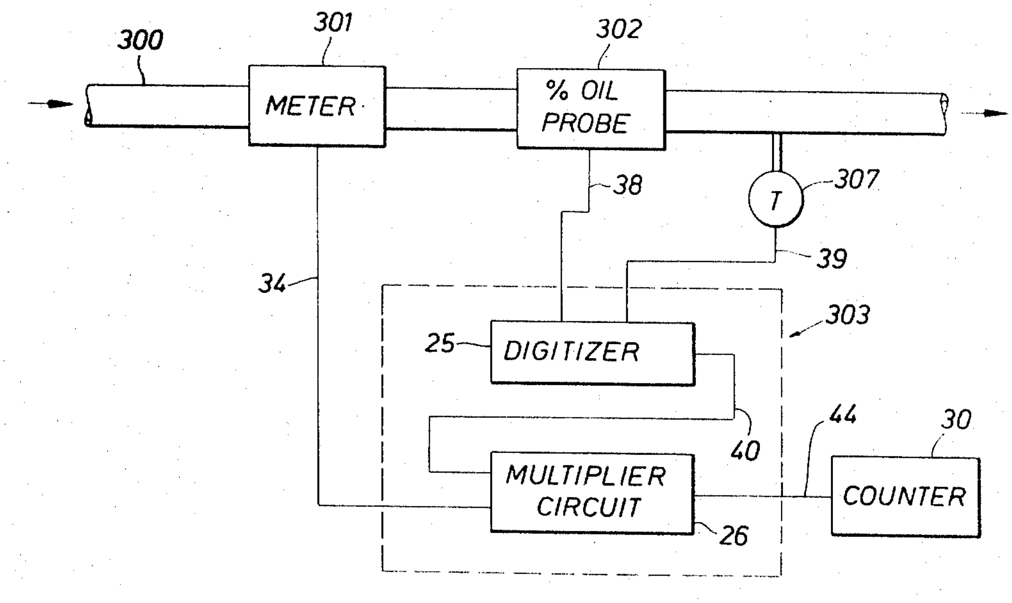
FIG. 8 is a schematic block diagram illustrating another embodiment of the digital multiplying means as it may be utilized for determining the volume of oil flowing in a pipeline when the total flow includes oil, saltwater and other contaminants.

Another application of the digital multiplying circuit invention disclosed herein is shown in FIG. 8. Crude oil, salt water and other fluids are shown floating in pipeline 300. A flow meter 301 measures the flow of the fluid in the pipe. A capacitance probe device 302 measures the quantity of oil in the total flow and generates a "percentage oil" output signal applied via conductor 38 as the input to a digitizer circuit 25, identical to the circuit disclosed in FIG. 2 and hereinabove described. The meter pulse output is applied via conductor 34 as an input to a multiplier circuit 26, identical to the multiplier circuit 26 shown in FIG. 3.

A temperature signal, generated by measuring device 307, is applied via conductor 39 to the digitizer 25. The "percentage oil" signal is applied via conductor 38 to the digitizer circuit in place of the usual temperature or pressure input signal. The temperature signal, via conductor 39, is applied as a division input in place of the reset voltage utilizing a function generating circuit as shown in FIG. 5. The output of the digitizer 25 is applied via conductor 40 to multiplier circuit 26, the output of which is applied via conductor 44 to counter 30.

Utilized the above described circuitry, the total oil in the fluid flowing in pipeline 300 may be determined and simultaneously temperature corrected by solving the following equation: $\mathrm{OIL}_{TF} = (MP)\ (\%\mathrm{OIL})/F(T)$
where $\mathrm{OIL}_{TF}$ represents the total flow of oil;

MP represents the meter pulse;

%OIL represents the percentage of oil in the fluid; and

F(T) represents the correction factor for the temperature of the fluid.

The output of digitizer 25 will be a digitized signal representative of the factor $\%\mathrm{OIL}/F(T)$ and applied via conductor 40 to the multiplying circuit 26 to be multiplied by the number of meter pulses received via conductor 34 as hereinbefore described. The multiplied output, of course, is displayed in counter 30.

Figure 9:
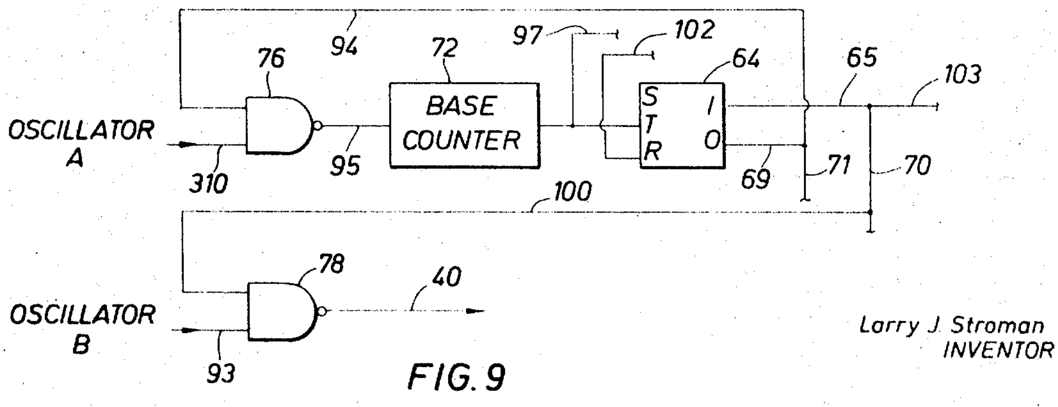
FIG. 9 is an electrical schematic of a portion of the digitizer circuit showing a modification of the oscillator gating circuit and the use of an additional oscillator to achieve a second multiplication input.

In some measurement applications, it may be desirable to provide more than one multiplication input or factor. A second multiplication factor may be achieved in the manner shown in FIG. 9. A first oscillator A, which may be identical to the oscillator circuit shown in FIG. 2 or any other suitable oscillator circuit, is shown applying its input via conductor 310 as one input to the gating circuit comprising NAND gates 76 and 78. NAND gate 76 is enabled and disabled by the application of the 0 output of bistable circuit 64 as hereinbefore described. The oscillator pulses of oscillator A control the operation of the base counter 72 as hereinbefore described in regard to FIG. 2.

A second oscillator B is shown applying its output via conductor 93 to the input of NAND gate 78, the operation of which is controlled by the 1 output of bistable circuit 64 via conductors 65, 70 and 100. NAND gate 78 passes the pulses of oscillator B via conductor 40 as D-pulses, hereinbefore described in detail with regard to FIGS. 2 and 4. By selecting different frequencies for oscillators A and B, the ratio of the number of digital signals passed by gates 76 and 78 will reflect the ratio of the two selected frequencies, thereby providing in effect, a second multiplier, or multiplying factor. The first multiplier input is, of course, applied via conductor 38 to the input switching circuit of digitizer 25 as previously described. The ratio between the frequencies of oscillators A and B will provide a multiplying factor if desired according to the following equation:

$$Q_{OUT} = (MP)\ (E_{IN})\ (f_B/f_A)$$

where:

$Q_{OUT}$ is the measured quantity desired;

$MP$ represents the number of meter pulses;

$E_{IN}$ is the signal applied via conductor 38 as the input to digitizer 25;

$f_B$ is the frequency of the oscillator B; and $f_A$ is the frequency of oscillator A.

In all of the applications discussed, the flow meters shown may be of either the positive displacement or the turbine type. In using turbine meters with the digital multiplying circuitry herein disclosed, additional conventional circuitry would be necessary to divide down the high frequency digital signals generated by the turbine meter prior to applying the meter signals as an input to the multiplying circuit.

Numerous variations and modifications may obviously be made in the structure herein described without departing from the present invention. Accordingly, it should be clearly understood that the forms of the invention described and shown in the figures of the accompanying drawings are illustrative only and are not intended to limit the scope of the invention.

What is claimed is:

1. A circuit for obtaining the product between a known digital signal and a varying multiplying factor, comprising digitizing means for generating a discrete series of digital signals representative of the multiplying factor, digital pulse generating means cooperating with said digitizing means for generating at least a pair of time-spaced digital signals, and multiplying circuit means for receiving said discrete series of digital signals, said at least a pair of time-spaced digital signals and the known digital signal and passing said discrete series of digital signals only in response to receipt of the predetermined signal and said at least a pair of the time-spaced digital signals, said passed series of digital signals representative of the product of said output signals of said digitizing means and the known digital signals.

2. The circuit as described in claim 1, wherein said multiplying circuit means includes a first gating circuit for receiving the predetermined digital signal and generating an output signal in response thereto, a second gating circuit for receiving said at least a pair of time-spaced digital signals and said output signal from said first gating circuit and generating an output digital signal in response to the receipt of said at least a pair of time-spaced digital signals when an output signal from said first gating means has been received, and a third gating circuit for receiving said output digital signal from said second gating circuit and said discrete series of digital signals passed by said gating circuit of said digitizing means, said third gating circuit passing said received discrete series of digital signals only in response to the receipt of said output digital signal from said second gating circuit.

3. The circuit as described in claim 2, wherein said multiplying circuit means further includes a counting circuit for receiving said discrete series of digital signals from said third gating circuit and generating an output signal in response to counting a predetermined number of said digital signals, and indicating means for receiving said counting circuit output signal and indicating the product of the values of the predetermined digital signal and the varying multiplying factor representative of the ratio between said first and second analog signals.

4. The multiplying circuit as described in claim 3, wherein said multiplying circuit means further includes gating means cooperating with said third gating circuit for receiving a discrete series of digital signals separated in time from said discrete series of digital signals received from said gating circuit of said digitizing means and passing both of said time separated discrete series of digital pulses to the input of said counting circuit and to count the total of both of said series of digital pulses.

5. The multiplying circuit as described in claim 1, wherein said digitizing means includes an oscillator for generating a continuous series of digital signals, and a gating circuit for receiving said continuous series of digital signals and gating a discrete series of said signals representative of the multiplying factor to the input of said multiplying circuit means in response to discrete control signals generated by said digitizing means.

6. The multiplying circuit as described in claim 1, wherein said digitizing means includes a pair of oscillators each generating a continuous series of digital signals, the frequency of said respective oscillators being selected to provide a predetermined ratio of frequencies, and a gating circuit for receiving said continuous series of digital signals from one of said pair of oscillators and gating a discrete series of said signals to said multiplying circuit means in response to a discrete control signal generated by said digitizing means, said discrete series of digital signals applied to said multiplying circuit means representing the product of said predetermined frequency ratio of said pair of oscillators and the varying multiplying factor.

7. A circuit for multiplying a predetermined digital signal by a variable factor represented by the ratio between a pair of analog signals, comprising switching means for receiving the pair of analog signals and alternately applying each of said signals as an output signal in response to discrete control signals, an integrator circuit for receiving the alternate analog signals as an output of said switching means and generating an output signal representative of the integration of said alternately applied signals, a level detector for receiving the output signal of said integrator circuit and generating an output signal in response to a predetermined signal level of said integrator output signal, oscillator means for generating at least one continuous series of digital signals and alternately applying a discrete series of said signals as first and second outputs in response to discrete control signals, a counting circuit for counting said discrete series of digital signals received from said first output of said oscillator means and generating an output signal in response to counting a predetermined number of said signals, control circuit means for receiving said output signals of said level detector and said counting means and generating discrete control signals in response thereto, said signals being applied to said switching means and said oscillator means to control the output signals thereof, digital pulse generating means for receiving one of said output control signals from said control circuit means and said output signal from said counting circuit and generating at least a pair of time-spaced digital signals corresponding to the time spacing between each of said counting circuit output signals, and multiplying circuit means for receiving said discrete series of digital pulses from said second output of said oscillator means, said at least a pair of time-spaced digital signals and the predetermined digital signal and passing said discrete series of digital signals only in response to receipt of the predetermined digital signal and said at least a pair of time-spaced digital signals.

8. The circuit as described in claim 7, wherein said multiplying circuit means includes a first gating circuit for receiving the predetermined digital signal and generating an output signal in response thereto, a second gating circuit for receiving said at least a pair of time-spaced digital signals and said output signal from said first gating circuit and generating an output digital signal in response to the receipt of said at least a pair of time-spaced digital signals when an output signal from said first gating means has been received, and a third gating circuit for receiving said output digital signal from said second gating circuit and said discrete series of digital signals received from said oscillator means, said third gating circuit passing said received discrete series of digital signals only in response to the receipt of said output digital signal from said second gating circuit.

9. The circuit as described in claim 8, wherein said multiplying circuit means further includes a counting circuit for receiving said discrete series of digital signals from said third gating circuit and generating an output signal in response to counting a predetermined number of said digital signals, and indicating means for receiving said counting circuit output signal and indicating the product of the values of the predetermined digital signal and the ratio of the analog signals.

10. The multiplying circuit as described in claim 7, wherein said oscillator means comprises an oscillator for generating a continuous series of digital signals, and a gating circuit for receiving said continuous series of digital signals and alternately gating a discrete series of said signals to the inputs of said counting circuit and said multiplying circuit means in response to said discrete control signals.

11. The circuit as described in claim 7, wherein said oscillator means comprises a pair of oscillators each generating a continuous series of digital signals, the frequency of said respective oscillators being selected to provide a predetermined ratio of frequencies, a first gating circuit for receiving said continuous series of digital signals from one of said pair of oscillators and gating a discrete series of said signals to the input of said counting circuit in response to a first discrete control signal, and a second gating circuit for receiving said continuous series of digital signals from the other of said pair of oscillators and gating a discrete series of said signals to said multiplying circuit means in response to a second discrete control signal, said discrete series of digital signals gated to said multiplying circuit means in alternate time sequence to said discrete series of digital signals applied from said one of said pair of oscillators to said counting circuit, said discrete series of digital signals applied to said multiplying circuit means representing the product of said predetermined frequency ratio of said pair of oscillators and the ratio of the pair of analog signals.

12. A circuit for multiplying known digital signals by an analog signal of unknown value, comprising digitizing circuit means for receiving the analog signal of unknown value and generating a discrete burst of digital pulses, the time duration of said burst and the number of pulses in said burst being directly related to the magnitude of said analog signal, digital pulse generating means responsive to input signals from said digitizing circuit means for generating at least a pair of time-spaced digital multiplying circuit means for receiving said discrete burst of digital pulses, said at least a pair of time-spaced digital signals, and the known digital signals and passing said discrete burst of digital signals only in response to the occurrence of the known digital signal and a succeeding occurrence of said at least a pair of time-spaced digital signals for forming a discrete series of digital pulses, the number of digital pulses in said discrete series of digital pulses being directly related to the product of the known digital signal and the magnitude of the analog signal of unknown value.

13. The circuit as described in claim 12, wherein said digitizing circuit means includes input switching means for receiving the analog signal of unknown value and an analog signal of known value and alternately applying each of said analog signals as an output signal in response to discrete control signals, an integrator circuit for receiving the alternate analog output signals from said input switching means and generating an output signal respresentative of the integration of said alternately applied signals, a level detector for receiving the output signal of said integrator circuit and generating an output signal in response to a predetermined signal level of said integrator output signal when integrating said analog signal of known value, oscillator means for generating at least one series of digital pulses, a counting circuit for counting digital pulses and generating an output signal in response to counting a predetermined number of said pulses, first gating means connected between said oscillator means and said counting circuit to gate said oscillator pulses to said counting circuit upon the receipt of a first control signal, control circuit means for receiving said output signals from said level detector and said counting circuit and generating in response thereto first and second discrete control signals, said first control signal being applied to said first gating circuit for controlling the operation of said first gating circuit, both of said control signals being applied to said input switching means to control the switching action thereof, and second gating means connected to the output of said oscillator means and in response to said second control pulse gating a burst of digital pulses therethrough, the time duration and number of pulses in said burst being directly related to the magnitude of said analog signal of unknown value.

14. The circuit as described in claim 12, wherein said digital pulse generating means includes signal generating means for receiving said second control pulse and said output signal from said counting circuit and generating at least a pair of time-spaced digital signals, the time spacing between said signals being greater than the time duration of said discrete burst of digital pulses.

15. The circuit as described in claim 13, wherein said input switching means comprises a pair of field-effect transistors, the drain leads of each of which are interconnected and also connected to the input of said integrator circuit, one of the analog signals being applied to the source lead of one of said pair of transistors and the other of said analog signals being applied to the source lead of the other one of said pair of transistors, said first control signal from said control circuit means said applied to the gate lead of one of said transistors and the second control signal being applied to the gate lead of the other of said transistors for causing each of said transistors to be alternately switched to a conducting state in response to the receipt of alternate ones of said first and second control signals.

16. The circuit as described in claim 13, wherein said control circuit means comprises a bistable multivibrator circuit.

17. The circuit as described in claim 12, wherein said multiplying circuit means includes a first gating circuit for receiving the known digital signals and generating an output signal in response thereto, a second gating circuit for receiving said at least a pair of time-spaced digital signals and said output signal from said first gating circuit and generating an output digital signal in response to the receipt of said at least a pair of time-spaced digital signals when an output signal from said first gating circuit has been received, and a third gating circuit for receiving said output digital signal from said second gating circuit and said burst of digital pulses received from said digitizing circuit means, said third gating circuit passing said burst of digital pulses only in response to the receipt of said output digital signal from said second gating circuit.

18. The circuit as described in claim 12, further including a counting circuit for receiving said discrete series of digital pulses from said multiplying circuit means and generating an output signal in response to counting a predetermined number of said digital pulses, and indicating means for receiving said counting circuit output signals and indicating a value directly related to the product of the known digital signal and the analog signal of unknown value.

19. The circuit as described in claim 17, wherein said multiplying circuit means further includes a fourth gating circuit cooperating with said third gating circuit for receiving a discrete series of digital pulses separated in time from said discrete series of digital pulses received from said digitizing circuit means and passing both of said time separated discrete series of digital pulses to the input of said counting circuit to count the total of both of said series of digital pulses.

20. The circuit as described in claim 13, wherein said oscillator means comprises a pair of oscillators of first and second frequencies, each generating a continuous series of digital pulses, the frequency of said oscillators being selected to provide a predetermined ratio of frequencies, said first series of digital pulses having a first frequency being applied to said first gating means for application to said counting circuit, said second series of digital pulses having a second frequency being applied to said second gating means for generating said discrete burst of digital pulses, the number of said pulses in said discrete burst of pulses being directly related to the product of said predetermined frequency ratio of said pair of oscillators and the analog signal of unknown value.

21. A circuit for multiplying known digital signals by a ratio of a pair of analog signals of unknown value, comprising digitizing circuit means for receiving the pair of analog signals of unknown value and generating a discrete burst of digital pulses, the time duration of said burst and the number of pulses in said burst being directly related to the magnitude of the ratio of said analog signals, digital pulse generating means responsive to input signals from said digitizing circuit means for generating at least a pair of time-spaced digital signals, and multiplying circuit means for receiving said discrete burst of digital pulses, said at least a pair of time-spaced digital signals, and the known digital signals and passing said discrete burst of digital signals only in response to the occurrence of the known digital signal and a succeeding occurrence of said at least a pair of time-spaced digital signals for forming a discrete series of digital pulses, the number of digital pulses in said discrete series of digital pulses being directly related to the product of the known digital signal and the magnitude of the ratio of the pair of analog signals of unknown value.

22. The circuit as described in claim 21, wherein said digitizing circuit means includes input switching means for receiving the first analog signal of unknown value and the second analog signal of unknown value and alternately applying each of said analog signals as an output signal in response to discrete control signals, an integrator circuit for receiving the alternate analog output signals from said input switching means and generating an output signal representative of the integration of said alternately applied signals, a level detector for receiving the output signal of said integrator circuit and generating an output signal in response to a predetermined signal level of said integrator output signal when integrating said second analog signal of unknown value, oscillator means for generating at least one series of digital pulses, a counting circuit for counting digital pulses and generating an output signal in response to counting a predetermined number of said pulses, first gating means connected between said oscillator means and said counting circuit to gate said oscillator pulses to said counting circuit upon the receipt of a first control signal, control circuit means for receiving said output signals from said level detector and said counting circuit and generating in response thereto first and second discrete control signals, said first control signal being applied to said first gating circuit for controlling the operation of said first gating circuit, both of said control signals being applied to said input switching means to control the switching action thereof, and second gating means connected to the output of said oscillator means and in response to said second control pulse gating a burst of digital pulses therethrough, the burst duration and number of pulses in said burst being directly related to the magnitude of the ratio of said analog signals of unknown value.

23. The circuit as described in claim 21, wherein said digital pulse generating means includes signal generating means for receiving said second control pulse and said output signal from said counting circuit and generating at least a pair of time-spaced digital signals, the time spacing between said signals being greater than the time duration of said discrete burst of digital pulses.

24. The circuit as described in claim 22, wherein said input switching means comprises a pair of field-effect transistors, the drain leads of each of which are interconnected and also connected to the input of said integrator circuit, one of the analog signals being applied to the source lead of one of said pair of transistors and the other of said analog signals being applied to the source lead of the other one of said pair of transistors, said first control signal from said control circuit means being applied to the gate lead of one of said transistors and said second control signal being applied to the gate lead of the other of said transistors for causing each of said transistors to be alternately switched to a conducting state in response to the receipt of alternate ones of said first and second control signals.

25. The circuit as described in claim 22, wherein said control circuit means comprises a bistable multivibrator circuit.

26. The circuit as described in claim 21, wherein said multiplying circuit means includes a first gating circuit for receiving the known digital signals and generating an output signal in response thereto, a second gating circuit for receiving said at least a pair of time-spaced digital signals and said output signal from said first gating circuit and generating an output digital signal in response to the receipt of said at least a pair of time-spaced digital signals when an output signal from said first gating circuit has been received, and a third gating circuit for receiving said output digital signal from said second gating circuit and said burst of digital pulses received from said digitizing circuit means, said third gating circuit passing said burst of digital pulses only in response to the receipt of said output digital signal from said second gating circuit.

27. The circuit as described in claim 21, further including a counting circuit for receiving said discrete series of digital pulses from said multiplying circuit means and generating an output signal in response to counting a predetermined number of said digital pulses, and indicating means for receiving said counting circuit output signals and indicating a value directly related to the product of the known digital signal and the analog signal of unknown value.

28. The circuit as described in claim 26, wherein said multiplying circuit means further includes a fourth gating circuit cooperating with said third gating circuit for receiving a discrete series of digital pulses separated in time from said discrete series of digital pulses received from said digitizing circuit means and passing both of said time separated discrete series of digital pulses to the input of said counting to count the total of both of said series of digital pulses.

29. The circuit as described in claim 22, wherein said oscillator means comprises a pair of oscillators of first and second frequencies, each generating a continuous series of digital pulses, the frequency of said oscillators being selected to provide a predetermined ratio of frequencies, said first series of digital pulses having a first frequency being applied to said first gating means for application to said counting circuit, said second series of digital pulses having a second frequency for applied to said second gating means for generating said discrete burst of digital pulses, the number of said pulses in said discrete burst of pulses being directly related to the product of said predetermined frequency ratio of said pair of oscillators and the analog signal of unknown value.

* * * * *

PO-1050
(5/69)

UNITED STATES PATENT OFFICE
CERTIFICATE OF CORRECTION

Patent No. 3,745,318 Dated July 10, 1973

Inventor(s) Larry J. Stroman

It is certified that error appears in the above-identified patent and that said Letters Patent are hereby corrected as shown below:

Col. 5, line 47, "57" should read --56--.
Col. 13, line 17, "of" should be omitted.
Col. 17, line 11, the word --digital-- should be inserted after "predetermined".
Col. 19, line 67, the words --signals, and-- should be inserted after "digital".
Col. 21, line 2, "said applied" should read --being applied--.
Col. 22, line 64, "burst" should read --time--.
Col. 24, line 20, the word --circuit-- should be inserted after "counting".

Signed and sealed this 20th day of November 1973.

(SEAL)
Attest:

EDWARD M.FLETCHER,JR.
Attesting Officer

RENE D . TEGTMEYER
Acting Commissioner of Patents